Aug. 18, 1936.  C. ADLER, JR  2,051,194
HIGHWAY PATROL SYSTEM
Filed Nov. 18, 1935  3 Sheets-Sheet 1
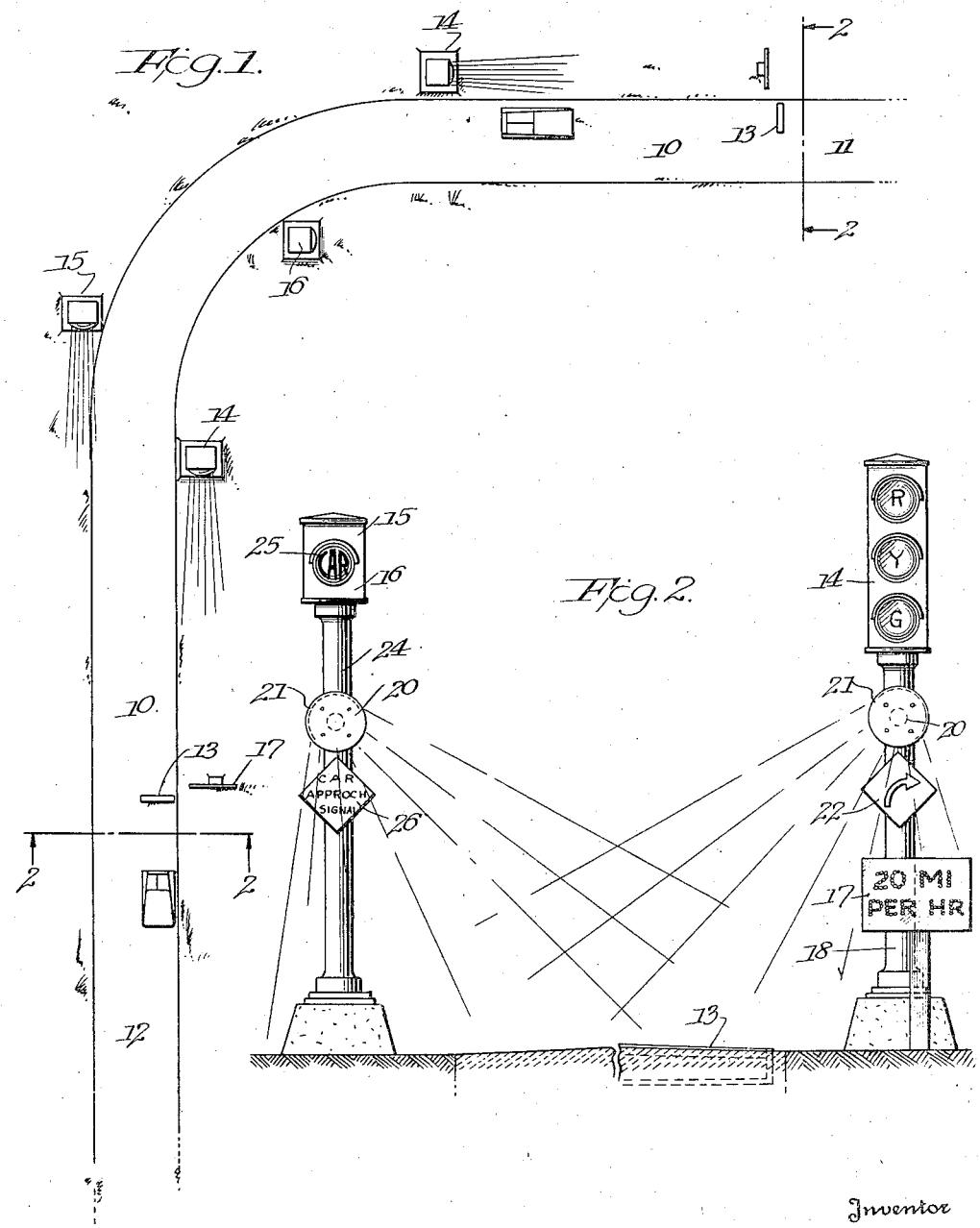
Inventor
Charles Adler Jr.,
By
Attorneys Aug. 18, 1936.         C. ADLER, JR         2,051,194
                     HIGHWAY PATROL SYSTEM
                    Filed Nov. 18, 1935         3 Sheets-Sheet 2

Inventor
Charles Adler Jr.
By Cushman, Darby & Cushman
Attorneys

Aug. 18, 1936.   C. ADLER, JR   2,051,194
HIGHWAY PATROL SYSTEM
Filed Nov. 18, 1935   3 Sheets-Sheet 3

Inventor
Charles Adler Jr.,
By [signature]
Attorneys

Patented Aug. 18, 1936

2,051,194

UNITED STATES PATENT OFFICE 2,051,194

HIGHWAY PATROL SYSTEM

Charles Adler, Jr., Baltimore, Md.

Application November 18, 1935, Serial No. 50,459

2 Claims. (Cl. 177—337)

My invention relates to an automatic self-patrol system for vehicular highways and particularly for continuous roadways as distinguished from intersections. Such roadways frequently have hazardous zones, for example, curves and other types of angular turns, narrow bridges, hillcrests, tunnels, fire stations, entrances to towns, road ends, approaches to circles, and many others, all of which are recognized as potentially dangerous to vehicular traffic. It is a fact that accidents frequently occur at these dangerous points due to (1) vehicles travelling at a high speed, (2) the failure of the driver to keep to his side of the road, or (3) the driver's attempt to pass another vehicle.

It is the purpose of this invention therefore to (a) compel the driver of a vehicle to travel at a safe speed through the hazardous section, and (b) simultaneously warn and advise him of the presence of a vehicle approaching in the opposite direction. To this end, I provide a system which is self-patrolling and is automatically actuated by traffic.

To my knowledge, many control systems have been suggested, but the number of fatal accidents continues to increase each year. The present invention is distinguished from prior installations in that it comprises combined compelling and advising or warning features. That is to say, and taking for example a sharp or dangerous curve, I employ a suitable traffic signal having green (go) and red (stop) indications with the red or compelling "stop" light normally illuminated, which signal is positioned visibly relative to the entrance of the dangerous road section. Electrically connected with the signal and operable therewith is a warning device or sign disposed at an appropriate point in the curve to indicate the approach of a vehicle in the other direction and thereby give timely warning and advice to a driver of this fact. Such a signal and "car approaching" sign combination may be positioned adjacent each entrance point on the dangerous curve and will have the effect of compelling the driver to negotiate the curve at a safe speed on his side of the road.

The signal and sign are actuated by vehicles travelling over an element or unit disposed in the roadway and preferably one with which the wheels or tires contact and cause the signal and sign to be operated through suitable electrical means. This electrical means includes a timing device for regulating the period which will elapse before the signal is changed from red to green after passage of a vehicle over the traffic element, as well as the period during which the green light or "go" signal will remain illuminated before reverting to normal "red" or "stop", the electrical means being of a type to render the traffic signal and sign automatically reverting. In the case of the sign, this is illuminated or rendered indicating immediately the vehicle engages the traffic element and remains so until the timing device permits the signal to revert to normal. In the event there is a succession of vehicles in close sequence, both the green light and the sign will remain illuminated until a gap occurs in the traffic stream, when the signal and sign will revert to normal.

With respect to the traffic light and traffic actuated element for operating the same, these are spaced apart a distance such that unless the driver slows down to a safe speed of, say, twenty miles per hour, as directed by a road marker visibly disposed adjacent the traffic element, he will be compelled to stop at the traffic signal, since the timing means for changing the signal from red to green is correlated with the distance between the element and signal and the prescribed speed for safety. On the other hand, if the driver observes the speed limit, the signal will change to green by the time he reaches it, and he will pass unhindered at a speed which will enable the curve to be negotiated safely. It will be appreciated that the timing means may be adjusted, to take care of particular road conditions due to inclement weather or any other traffic situation. It will be noted, moreover, that if the driver is travelling on the wrong side of the road and therefore does not go over the traffic element, he will nevertheless be compelled to stop by reason of the presence of the normally red traffic light. Thus, a driver is compelled to (1) reduce his rate of travel to a safe speed for the particular hazard and (2) travel on the correct side of the road.

With regard to the advising and warning sign for indicating the approach of a car in the opposite direction, this is disposed in the line of vision of a driver and at a point in the curve such that the driver will have timely warning and be afforded an opportunity, if he be on the wrong side of the road, to return to the right side of the road and avoid collision with the approaching vehicle. As stated, the operation of this sign to give a positive indication, that is, its illumination, for example, is simultaneous with the actuation of the traffic actuated element, but the duration of its indication is controlled by the timing means associated with the electrical operating means.

The presence of the combined compelling signal and warning "car approach" sign for automatically and vehically patrolling the road will make the potentially dangerous zone safe, and, moreover, inspire alertness and deter both careless and reckless drivers. In addition, I illuminate the road, at both the signal and sign, at night, which illumination also acts as a further deterrent and during the day and at night if desired, a suitable flashing light or other constantly moving or reciprocating indicator may be employed to instill caution into the minds of those using the road and attract attention to the patrol devices.

It will be noted that my patrol system is automatic, self-patrolling and provides a plurality of deterring means correctly spaced in accordance with the nature of the hazard, to insure travel at a safe speed through the danger zone, as well as travel on the proper side of the road. These two factors are recognized as the prime cause of accidents, it being recognized that most fatalities are due to the driver losing control of the vehicle while travelling at high speed and of the temptation to pass at high speed other vehicles travelling in the same direction, as well as the habit of many drivers of travelling in the opposite lane and not remaining on the right side of the road.

The invention will be further understood by reference to the drawings and specification, where the improved automatic and self-patrolling roadway safety system will be described in detail.

Referring to the drawings,

Figure 1 is a diagrammatic view of the system, illustrated by way of example installed upon a curve;

Figure 2 is a sectional view on either line 2—2 of Figure 1 looking in the direction of a driver approaching the curve from either entrance thereto;

Figure 3:
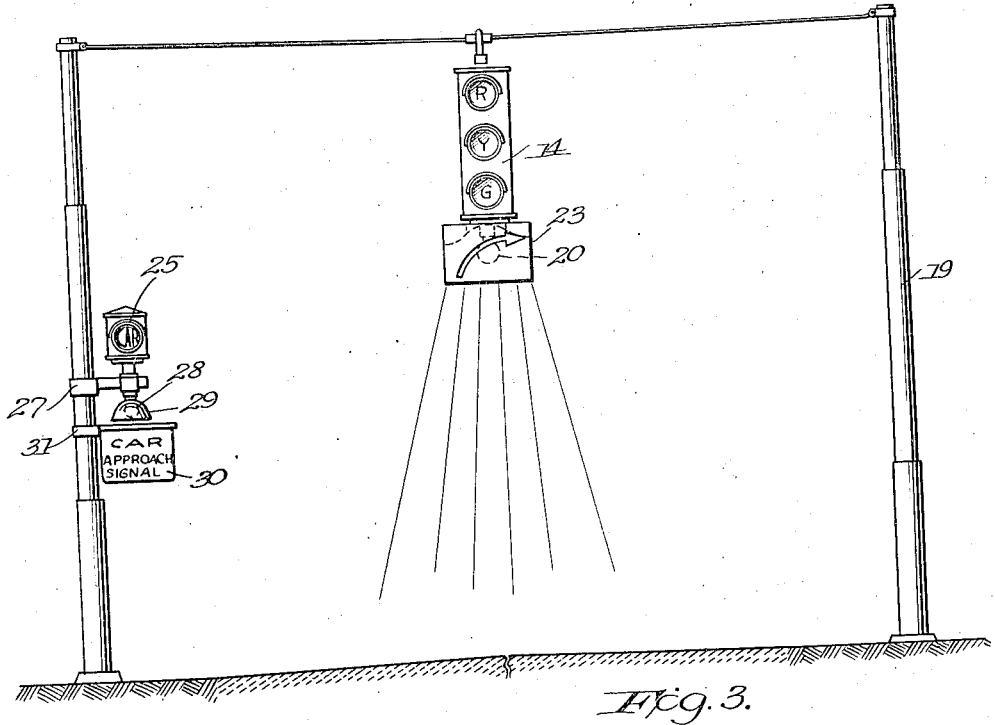
Figure 3 is a modification showing in elevation the signal suspended over the roadway as distinguished from being supported adjacent one side thereof as in Figures 1 and 2.

Referring to the drawings, I have illustrated, by way of example only, in Figure 1, the invention applied to a curve, but it will be adapted in a similar manner to any of the various road hazard sections or danger zones in a substantially similar manner.

The entrances to the curve are indicated at 11 and 12, respectively, and at each entrance section there is disposed in or below the surface at the correct side of the road a traffic actuated element 13 with each of which is electrically associated the adjacent traffic signal 14 and a remote "car approach" sign or warning device 15 or 16. That is to say, the "car approach" sign 15 is associated with the traffic actuated element 13 disposed at the entrance 11 and the adjacent traffic signal 14, while the "car approach" sign 16 is associated with the traffic actuated element 13 at the entrance 12 and the adjacent traffic signal 14.

The traffic actuated signal 13 is of any conventional design, being preferably disposed flush with the roadway as shown in Figure 2 and comprising a member adapted to be compressed by contact of wheels or tires of vehicles travelling thereover and break or make an electric circuit to operate the signal and "car approach" sign or device.

Adjacent each traffic actuated element 13 is visibly disposed a marker 17 bearing the indication "speed limit twenty miles per hour", or whatever rate is determined as safe and for which the timing of the signal changing means is adjusted. Of course, this marker may bear any other suitable indicia such as "danger" and/or "traffic light and car approach sign ahead".

The traffic signal 14 is of conventional design and in Figure 2 is shown as mounted on a pedestal 18 at one side of the roadway while in Figure 3 it is shown as suspended from stanchions 19 over the roadway. Preferably, the traffic signal includes red, yellow, and green lenses, with which are associated suitable illuminating means, particularly electric lamps of the type shown and described in the United States patent to Charles Adler, No. 1,889,725, November 29, 1932, in which the filaments are screened from each other and permanently and electrically connected in parallel.

Figure 4:
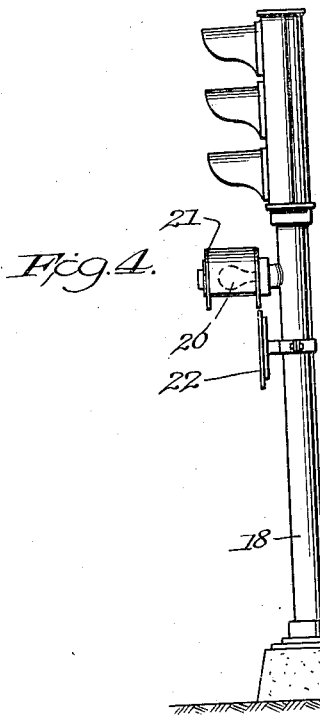
Figure 4 is a side elevation of one of the traffic signals of the pedestal type.

There is also mounted on the pedestal of the traffic signal, as shown in Figures 2 and 4, a lamp 20 and a reflector 21 adapted to reflect the light upon the road, as well as upon a suitable marker 22 secured to the pedestal in any suitable manner as by brackets and bearing an indication such as a curved arrow or some other designating symbol or indicia. A similar construction may be employed with the signal of Figure 3, or in both Figures 2 and 3, the lamp 20 may be disposed in a housing 23 and adapted to display a curved arrow or other indicia on the face of the housing and at the same time, by means of a suitable reflector in the housing project light from the lamp 20 upon the road.

The traffic light is positioned at a point relative to the curve so as to compel the driver to cut down his speed or stop, and insures that he will negotiate the hazard at a safe rate on the right side of the road and at the same time is positioned so as to be visible for a substantial distance in advance of the curve. The distance between the traffic actuated element and the traffic signal is such that a driver will be able to reduce the speed of the vehicle and maintain it at the required rate so that by the time the traffic signal is reached, the timing means associated with the traffic element and signal will cause the signal to change to green and the driver may pass unhindered. On the other hand, if the driver does not reduce his rate of speed or is not traveling in the lane of the traffic actuated element, he will be confronted with the stop signal upon reaching the traffic light 14.

The "car approach" signs 15 and 16 are both similar in structure and, as shown in Figure 2, are mounted on a pedestal 24 positioned on the opposite side of the road from the traffic signal. It is preferred to use an illuminated "car approach" sign, and the lens or cover glass of the sign carries suitable indicia or tell-tales, such as "car" or "car approaching", which are displayed when an electric lamp associated therewith in back of the glass or lens is illuminated, thereby giving a positive warning indication. Also mounted on the pedestal 24 is a lamp 20 and reflector 21 similar to those previously described for illuminating the road as well as a marker 26 bearing the indicia "car approach signal" which is fixed by means of a bracket to the pedestal as shown.

It is to be understood that the lamps 20 of the signal and sign are illuminated only at night, but, if desired, they may be used for both day and night indication or for day indication alone by interposing a suitable light-flashing mechanism in the lamp circuit, or some other movable, e. g., oscillating or reciprocating indicating means may be used which will act to draw attention to the sign.

As distinguished from the time period which elapses after actuation of the traffic element 13 before the normal red of signal 14 changes to green, the "car approach" indication 25 is immediately illuminated simultaneously with the actuation of the remote traffic element 13 and it remains illuminated until the timing means causes the signal to revert to normal red. In this connection, the indication 25 is preferably constantly illuminated during such period but may be intermittently displayed by interposing a suitable light-flashing mechanism in the lamp circuit so as to give a flashing indication.

The car approach sign is positioned relative to the curve so as to be in the direct line of vision of a driver approaching the curve and is disposed sufficiently in advance of the curve so that a driver in the wrong lane will have an opportunity to move into the right lane and thereby avoid a collision.

It is to be noted that the traffic signal adjacent to one traffic actuated element and the associated car approach sign which is operated by the other traffic actuated element each face in the same direction toward approaching traffic which is made possible by electrically connecting the traffic element, its adjacent signal, and the remote "car approach" sign.

Figure 5:
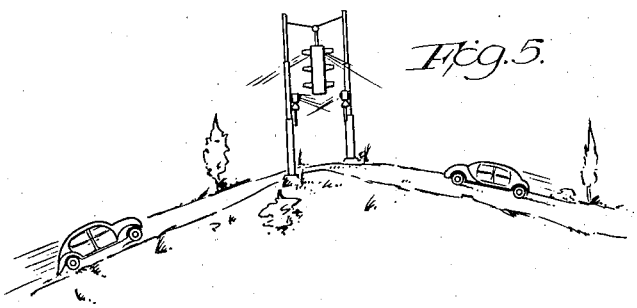
Figure 5 is a diagrammatic view illustrating the invention as applied to a hillcrest.

Referring to Figures 3 and 5, the "car approach" sign may be connected to one of the stanchions 19 as by a bracket 27 and a suitable lamp 28 and reflector 29 also carried by the bracket 27 are employed to direct light upon the roadway as well as upon a marker 30 carried by a bracket 31 on the stanchion.

In the case of Figure 5 where the construction of Figure 3 is positioned at a hillcrest, a "car approach" sign and associated construction, as above described, for example as shown in Figure 3, will be positioned upon a stanchion at each side of the road and these will be provided with duplicate or opposed cover glasses or lenses 25 so that each of the "car approach" signs will be rendered visible from opposite sides or faces of the sign.

It will be understood, of course, that as many signals and car approach signs may be utilized as necessary to afford proper self-patrol of the curve or other hazard and that in some cases only one combination of associated and cooperatively functioning signal, sign, and traffic actuated element may be necessary as where the hazard is present for vehicular travel in one direction only.

Figure 6:
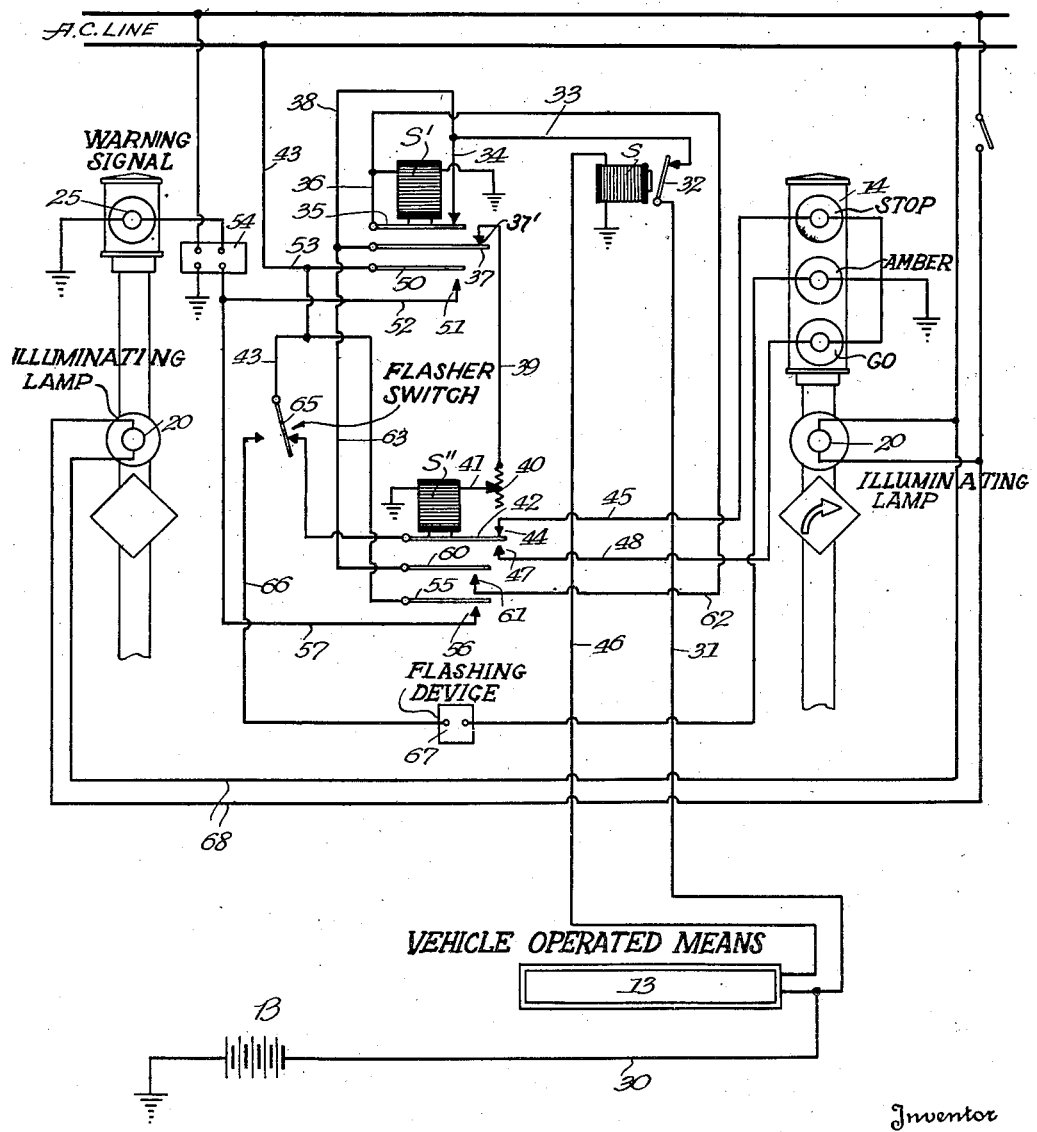
Figure 6 is a diagrammatic view showing the electrical circuit by which the signal and sign are connected to each other and actuated and illuminated from the traffic element with which they are associated.

In order that the operation of the invention may be thoroughly understood, reference is had to Figure 6. The traffic actuated element 13 is connected to a battery B through the line 30 and normally the circuit is from the battery through line 30 and line 31 to the arm 32 of detector relay coil S through line 33, line 34, arm 35 of relay coil S' and connection 36 to energize the relay coil S'. In the normal position, arm 35 is held up, as well as arm 37 by the relay coil S' and a circuit is made through the line 38 and arm 37 engaging contact 37' in line 39, through an adjustable resistance or timing device 40 of slow pickup, slow release S", and connection 41 to relay S" whereby the same is energized. When relay S" is energized, the arm 42 is held up and completes a circuit to illuminate the red element R of traffic signal 14. This circuit is through the line 43 connected to a suitable source of commercial alternating current and including the arm 42 which, in its upper position, engages the contact 44 in the line 45 of the signal lamp circuit. When the line 45 of the signal lamp circuit. When the parts are as thus described, the signal is at normal with the red or stop indication of the signal 14 displayed and the associated car approach sign 15 or 16 is not illuminated.

When the traffic actuated element 13 is actuated by passage of wheels or tires in contact therewith, a circuit is made through the line 46 to the relay S which attracts the arm 32 and breaks the circuit through the line 33. The relay S' is thus deenergized and the arm 37 drops to break the circuit to the relay S". This permits the arm 42 to drop by the deenergization of the relay S" and the dropping of the arm 42 is delayed for a definite predetermined time period as determined by the timing device 40 in accordance with the distance between the traffic actuated element 13 and the signal 14 on the road and the speed limit between these points specified by marker 17 so that the arm 42 will, after the desired elapsed period, engage the contact 47 of the line 48 in which the lamp for giving green indication on the traffic signal is included and, by this time, the driver, if he obeys the speed limit, will have reduced his speed and can pass along the roadway uninterrupted but at a speed safe for negotiating the hazard.

Simultaneously with the actuation of the traffic element 13 and the deenergization of the relay S', the arm 50 associated with the relay S' drops and engages the contact 51 included in a line 52 in which is also included the lamp for illuminating the lens or indication 25 of one "car approach" sign 15 or 16. The arm 50, as shown, is connected through the line 53 with the line 43 to the source of commercial alternating current. If desired, a suitable conventional type of light-flashing device 54 may be included in this circuit. It is to be particularly noted that while the change from red to green is delayed in accordance with a predetermined desired time period, the illumination of the "car approach" sign is simultaneous with the actuation of the traffic actuated element. In this connection, the deenergization of the relay S" causes the arm 55 to drop and engage the contact 56 included in the line 57 which is connected in the line 52 leading to the lamp of the "car approach" sign and this circuit will cause the "car approach" sign to remain illuminated until the traffic signal reverts to normal with the red indication again displayed.

Also, when the relay S" is deenergized, the arm 60 drops and engages a contact 61 in the line 62 in which is included the connection 36 to the relay S'. The opposite end of the arm is included in the line 63 connected to the line 38 and the line 34 to the arm 35 whereby the relay S' is energized immediately arm 60 and contact 61 are engaged. In this manner, automatic reversion of the signal to normal red is provided for, but such reversion, however, is governed by the timing device 40 so that the green will remain illuminated for a definite predetermined period sufficient to permit the passage of a vehicle or vehicles before the arm 42 is drawn upward to engage the contact 44 by energization of relay S''. As will be noted, constant actuation of the element 13 whereby the relay S' and relay S'' are deenergized, will cause the signal to continue displaying the green but immediately a break or gap in the line of traffic occurs, energization of relay S' will take place. The energization of relay S' will bring the arm 37 into contact with the contact member 37' included in the line 39 to energize the relay S'' which after a predetermined time causes the arm 42 to engage the contact 44 to give the normal red indication and the arm 55 to be disengaged from the contact 56 to extinguish the lamp for the warning device or indication 25. At the same time, the circuit provided by the arm 60 and contact 61 for energizing relay S' will also be broken and the circuit will be in normal position.

It is to be noted that since the relay S' is immediately energized when the arm 60 engages the contact 61, the arm 50 is retracted from the contact 51, breaking that circuit through the lamp of the "car approach" sign but, as the arm 55 engages the contact 56 in the associated or supplementary "car approach" sign lamp circuit, the lamp will continue illuminated until energization of the relay S'' breaks the circuit by retracting arm 55 simultaneously with the change from green to normal red and the lamp for the sign indication is extinguished.

The purpose of the relay S and arm 32 is to cause deenergization of the relay S' whenever the traffic device 13 is actuated while the circuit provided by the arm 60, line 62 and line 63 will immediately bring about energization of the relay S' when so deenergized, and then following a suitable time period, energization of relay S'', whence the signal reverts to normal.

In some cases, as where traffic is quite heavy for example, on Sundays and holidays it is not desired to use the red and green indications of the signal I interpose in the line 43 a manual switch 65 for connecting the lamp of the yellow indication of signal 14 in circuit with the alternating current source through the line 66 and there is interposed in the line 43—66 a suitable conventional flashing device 67 whereby a flashing amber light is constantly presented. In this manner, the flashing amber will constitute a warning signal.

The lamps 20 for illuminating the marker and road are connected through the line 68 to the source of alternating current as shown, and a suitable light flashing means such as shown at 54 or 67 may be included in this lamp circuit if desired, for either day or night purposes.

It will be observed that I employ an automatic reverting type signal wherein the lamp for the car approach warning sign is simultaneously illuminated with the actuation of the traffic element and continues to be illuminated until the signal changes from green to normal red, and that the timing means is so associated with the traffic element and traffic signal that a definite time interval elapses after the actuation of the traffic element before the change from red to green takes place and likewise before the change or reversion from green to red occurs and the car approach illuminating lamp is extinguished.

The invention, as stated, therefore includes the indicating or directing feature of the signal combined with the warning and advising feature of the car approach sign, the former controlling the speed about the hazard being negotiated and requiring driving on the correct side of the road and the latter giving definite advice of the presence of vehicles approaching in the opposite direction and on the other side of the road. The present signal solves a very vital safety problem occasioned by persons either unknowingly or carelessly driving at a high rate of speed through hazardous zones of a continuous roadway. The present signal not only insures that the driver will travel at a safe speed or stop, but in addition requires that he drive in the proper lane of traffic and at a proper speed. It is these self-patrol features in an automatic vehicle actuated patrol system which make the invention highly trustworthy whether it be used at a curve or at any other dangerous section of the highway.

I claim:—

1. A patrol system for roads in which traffic moves in opposite but parallel directions only, and in which a constant hazard exists requiring travel at a cautious speed on the right side of the road, comprising a signalling means disposed in advance of the hazard indicating to a driver that he must travel through the said hazard at a safe rate of speed, said signalling means comprising a signal having "stop" and "go" indications with the signal normally presenting the "stop" indication, vehicle actuated means disposed a distance in advance of said signal, means actuated by said vehicle actuated device to change the signal to "go" a predetermined time period after its actuation by the vehicle actuated means, whereby before the signal will change from "stop" to "go" the driver will be required to reduce his speed or stop if travelling too fast, to properly pass the signal on the right side of the road on the "go" indication, said means automatically returning said signal to the normal "stop" indication.

2. A patrol system for roads in which traffic moves in opposite but parallel directions only, and in which a constant hazard exists requiring travel at a cautious speed on the right side of the road, comprising a signalling means disposed in advance of the hazard indicating to a driver that he must travel through the said hazard at a safe rate of speed, said signalling means comprising a signal having "stop" and "go" indications with the signal normally presenting the "stop" indication, vehicle actuated means disposed a distance in advance of said signal, means actuated by said vehicle actuated device to change the signal to "go" a predetermined time period after its actuation by the vehicle actuated means, whereby before the signal will change from "stop" to "go" the driver will be required to reduce his speed or stop if travelling too fast, to properly pass the signal on the right side of the road on the "go" indication, said means automatically returning said signal to the normal "stop" indication, a car approach warning device connected with said means for actuating the signal, for warning a driver travelling in an opposite direction, said warning device being rendered operative when a vehicle actuates the vehicle actuated means and remaining active until the signal indication reverts to normal.

CHARLES ADLER, Jr.